United States Patent [19]
Lord

[11] Patent Number: 4,664,968
[45] Date of Patent: May 12, 1987

[54] HEAT-SETTABLE SEALANT MATERIAL

[75] Inventor: Allan Lord, Littleborough, England

[73] Assignee: TBA Industrial Products Limited, Manchester, England

[21] Appl. No.: 772,889

[22] Filed: Sep. 5, 1985

[30] Foreign Application Priority Data

Sep. 5, 1984 [GB] United Kingdom ............... 8422384

[51] Int. Cl.$^4$ ....................... B32B 13/02; C04B 14/38; E04B 1/16; F01N 7/16
[52] U.S. Cl. ...................................... 428/240; 106/97; 106/98; 106/99; 122/164; 181/282; 252/62; 428/253; 428/264; 428/267; 428/283; 428/289; 428/703; 428/906; 428/920
[58] Field of Search ....................... 106/85, 99, 97, 98; 122/164; 181/282; 252/62; 428/289, 703, 920, 240, 253, 264, 267, 283, 906

[56] References Cited

U.S. PATENT DOCUMENTS

| 4,414,262 | 11/1983 | Hartmann et al. | 428/289 |
| 4,515,636 | 5/1985 | Carney et al. | 428/375 |
| 4,528,238 | 7/1985 | Alford | 428/289 |

FOREIGN PATENT DOCUMENTS 2055857 3/1981 United Kingdom .

Primary Examiner—James C. Cannon
Attorney, Agent, or Firm—Nixon & Vanderhye

[57] ABSTRACT

An asbestos-free heat settable composition includes a fibrous reinforcement comprising aramid fibres in the form of a carded or needled non-woven web or felt, or a loosely woven or knitted fabric.

15 Claims, No Drawings

HEAT-SETTABLE SEALANT MATERIAL

This invention relates to heat-settable sealant material suitable for application to pipework for the conveyance of hot gas. Such pipework may for example form part of the exhaust system of the internal combustion engine of a vehicle.

One known form of heat-settable sealant material suitable for the stated purpose comprises discrete fibres of asbestos admixed with an aqueous solution of an alkali metal silicate (sodium silicate) so as to form a plastic paste with which holes formed by corrosion of the pipework can be stopped up. Another form comprises a felt of asbestos fibres, the felt being impregnated with an aqueous alkali metal silicate to form a bandage ('silencer repair bandage') which can be wrapped round, and moulded by hand round, the pipework to seal the holes. In either case, it is desirable to include in the sealant material a humectant, such as ethylene glycol, propylene glycol, glycerol or like polyhydroxy organic compound, to reduce the rate of water loss during storage of the material at ambient temperature and so keep it plastic. The material sets on heating (as when heated by hot exhaust gases) and forms an effective seal for several months.

The present invention is concerned with the provision of an asbestos-free sealant material, and is in part based on the discovery that other fibres, even though they are not heat-resistant in the sense that asbestos fibres are, can usefully be employed to reinforce heat-settable sealant material (and so keep it intact) during heat-setting on the substrate which it is to seal.

It has already been proposed that natural cellulose fibres, (preferably of the bast variety) should be used and GB No. 2055857B discloses cellulose fibre-enclosing compositions of this kind.

Although such compositions are effective as described it has now been found that improved performance can be obtained.

According to the present invention an asbestos-free heat settable composition comprises an aramid fibre reinforcement in the form of a carded or needled non-woven web or felt, or a loosely woven or knitted fabric, impregnated with an aqueous solution or dispersion of an inorganic heat settable binder, optionally containing finely powdered inert filler and containing a humectant to reduce the rate of water loss from the composition during storage at ambient temperatures.

The use of these particular forms of reinforcement is particulary preferred. Not only are non-woven webs and/or felts likely to be cheaper than conventional textile fabrics, but all of the preferred reinforcements are more conformable than the latter. They wrap much better, a significant factor in achieving good sealing performance in use on a hot substrate.

The filler may be finely powdered clay, talc, silica or slate, or a mixture of two or more of these. Its function is to confer bulk, particularly to the set composition in use on a substrate.

Because aramid fibres are relatively expensive, the web, felt or fabric may include other synthetic organic fibres; in particular regenerated cellulose (viscose) fibres may be used. However it is desirable that the proportion of relatively low melting point and/or water-containing fibres should be kept below the amount at which delamination/cracking becomes a problem when the composition is subjected to service temperatures, in use.

Some experimentation may be necessary to arrive at a suitable fibre blend for a particular application, or end use tempterature, of course. However, the fibrous reinforcement must possess both sufficient integrity and conformability to render it effective as a reinforcement which will bond the composition together whilst allowing it to be wrapped tightly around a substrate on which it is to form a seal. The binder is preferably a water soluble or water dispersable silicate, although selected borates or phosphates may also be used. Sodium silicate is particularly preferred.

The invention will now be described with reference to the following example.

EXAMPLE

A needled felt comprising about ⅔ (by weight) viscose rayon fibres and ⅓ (by weight) aramid fibres (those sold under the registered trade marks KEVLAR and NOMEX were equally effective) was impregnated with an aqueous dispersion comprising about 25% by weight of sodium silicate, (on a solids basis) and 13% by weight clay, with the balance being water. A minor proportion of monoethlyene glycol was included as a humectant, to reduce the rate of water loss from the impregnated felt during storage.

The product was highly conformable and exhibited very satisfactory integrity on application by wrapping around a pipe. On heating to about 260° C. the composition hardened into a rigid mass without cracking/spalling, despite the temperature exceeding the charring point of the viscose fibres. The dried composite contained approximately 25% clay, 48% sodium silicate 9% of aramid fibres and 18% of (charred) viscose fibres, (all by weight).

I claim:

1. An asbestos-free, heat-settable sealant material adapted for wrapping and sealing the pipework of a part of the exhaust system of an internal combustion engine which material hardens into a rigid, crack-free mass and forms a seal that remains intact, the material hardening upon heating when the pipework of the exhaust system is heated by hot exhaust gases, said composition consisting essentially of:
    a fiberous reinforcement in the form of a carded or needled web or felt, a loosely woven fabric or a knitted fabric containing aramid fibers and regenerated cellulose fibers, the regenerated cellulose fibers being present in an amount below that at which delamination or cracking occurs when exposed to service temperatures in use, the fiberous reinforcement being readily conformable to seal the pipework to which the sealant material is attached, the reinforcement being impregnated with an aqueous dispersion of:
    a finely powdered filler to confer bulk to and to set the sealant material on the pipework,
    a water dispersible silicate heat-settable binder; and
    a humectant present in an amount to reduce the rate of water loss from and plasticize the composition during storage at ambient temperatures prior to heating.
    balance water.

2. A composition according to claim 1, in which the regenerated cellulose fibers constitute the major portion of the fiberous reinforcement.

3. A composition according to claim 2, in which the ratio of regenerated cellulose fibers to aramid fibers in the fibrous reinforcement is about 2:1 by weight.

4. A composition according to claim 1, in which the reinforcement is in the form of a non-woven web or felt.

5. A composition according to claim 1, in which the powdered filler is selected from clay, talc, silica, slate or mixtures thereof.

6. A composition according to claim 1, in which the silicate binder is sodium silicate.

7. A composition according to claim 1, in which the humectant is ethylene glycol, propylene glycol or glycerol.

8. A pipe wrap for wrapping and sealing the pipework of an internal combustion engine made of the composition of claim 1.

9. A composition according to claim 4, in the form of a wrapable bandage.

10. A roll of an asbestos-free, heat-settable pipe wrap adapted for wrapping and sealing the pipework of a part of the exhaust system of an internal combustion engine which material hardens into a rigid, crack-free mass and forms a seal that remains intact, the material hardening upon heating when the pipework of the exhaust system is heated by hot exhaust gases, said composition consisting essentially of:
a felt of fiberous reinforcement containing a mixture of aramid fibers and regenerated cellulose fibers, the regenerated cellulose fibers being present in an amount below that at which delamination or cracking occurs when exposed to service temperatures in use, the fiberous reinforcement being readily conformable to seal the paperwork to which the sealant material is attached, the reinforcement being impregnated with an aqueous dispersion of:
a finely powdered filler to confer bulk to and to set the sealant material on the peipework.
a water dispersible silicate heat-settable binder, and
a humectant present in an amount to reduce the rate of water loss from and plasticize the composition during storage at ambient temperatures prior to heating, balance water.

11. The pipe wrap roll according to claim 10, in which the regenerated cellulose fibers constitute the major portion of the fiberous reinforcement.

12. The pipe wrap roll according to claim 10, in which the ratio of regenerated cellulose fibers to aramid fibers in the fiberous reinforcement is about 2:1 by weight.

13. The pipe wrap roll according to claim 10, in which the powdered filler is selected from clay, talc, silica, slate or mixtures thereof.

14. The pipe wrap roll according to claim 10, in which the silicate binder is sodium silicate.

15. The pipe wrap roll according to claim 10, in which the humectant is ethylene glycol, propylene glycol or glycerol.

* * * * *